March 9, 1965     W. B. STRICKLAND     3,172,332
FLUID OPERATED MOTOR

Filed May 1, 1961     3 Sheets-Sheet 1

INVENTOR.
WYATT B. STRICKLAND
BY
ATTORNEYS

March 9, 1965     W. B. STRICKLAND     3,172,332
FLUID OPERATED MOTOR

Filed May 1, 1961     3 Sheets-Sheet 2

INVENTOR.
WYATT B. STRICKLAND
BY
ATTORNEYS

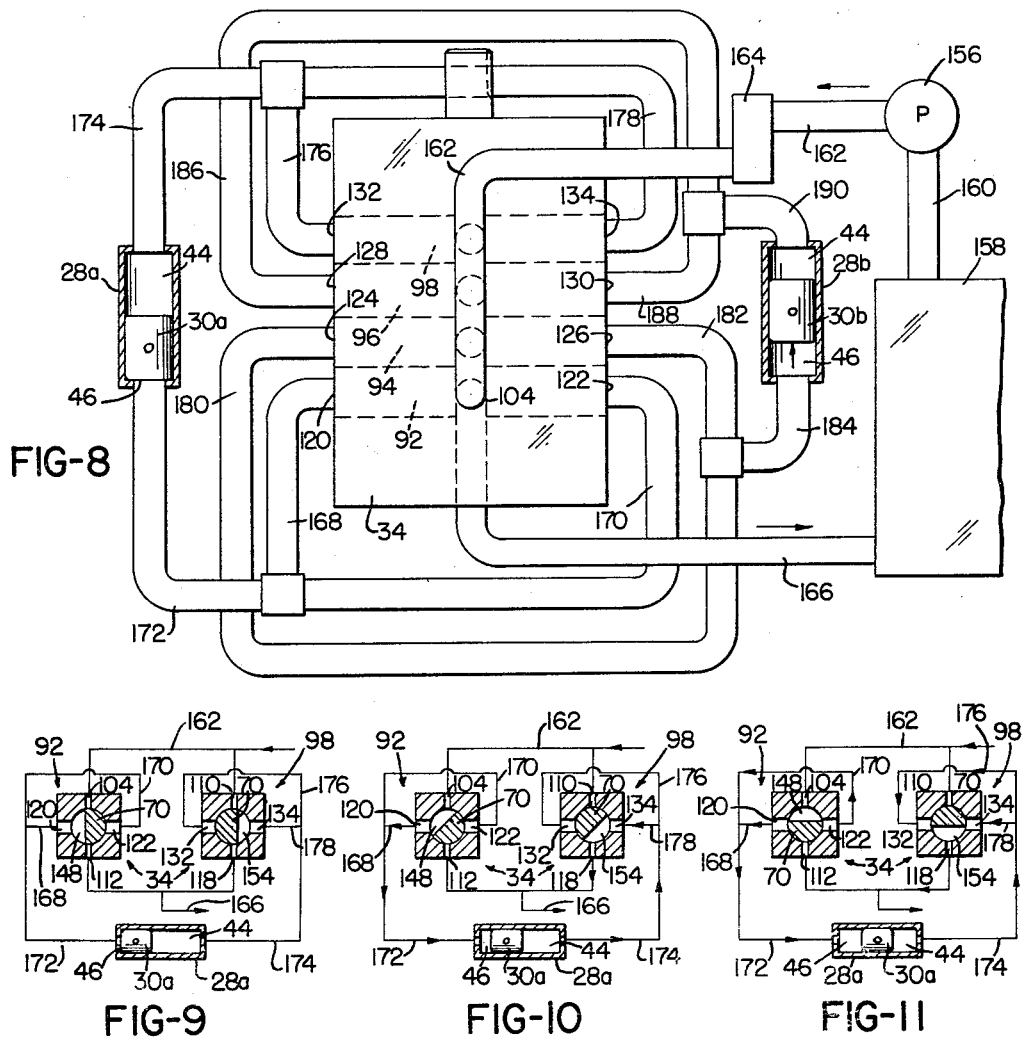

ns patented Mar. 9, 1965

3,172,332
FLUID OPERATED MOTOR
Wyatt Bailey Strickland, Austin, Tex., assignor to Thyco Engineering Corporation, a corporation of Texas
Filed May 1, 1961, Ser. No. 106,959
8 Claims. (Cl. 91—32)

The present invention relates to an improved fluid operated motor and the like and to an improved valve for distributing fluid pressure to such a motor or the like.

Heretofore, many different types of fluid operated motors have been provided. Similarly, many different types of valves have been provided for distributing fluid pressure to such motors or the like.

However, it has been found that existing fluid operated motors have inherent disadvantages because the prior known fluid operated motors were designed to also operate as pumps. Such prior known fluid operated motors each normally comprises a housing having a crankshaft rotatably mounted therein and one or more cylinder defining members respectively receiving pistons in the cylinders thereof, the pistons being operatively interconnected to the crankshaft to cause crankshaft rotation when the piston is driven in a particular direction by fluid pressure being directed against the working surface thereof. In other instances double acting pistons were employed but the effective operating areas of such pistons were necessarily unequal by virtue of a connecting rod connected thereto. In those instances where the pistons were connected to a crankshaft without utilizing a piston rod, only one side of such piston was utilized as a working surface.

According to the present invention, an improved fluid operated motor is provided wherein each of the pistons thereof has opposed working surfaces with equal areas whereby fluid pressure can be directed in a proper sequence against those working surfaces to cause a piston of this invention to have the equivalent working function of a two piston engine as will be apparent hereinafter.

It has been further found that existing fluid operated motors are limited in their ability to produce torque. One reason for this disadvantage in prior known fluid operated motors is due to the physical geometry of the design whereby very short moment arms are utilized. Thus, when the speed of rotation of prior known fluid operated motors drops to around fifty r.p.m., noticeable "humping" of the shaft speed is evident. Further, at speeds under 10 r.p.m., the prior-known fluid operated motors are easy to stall and, when once stalled, a relatively high fluid pressure is necessary to develop enough break-away torque to cause the fluid motor to start operating again.

The improved fluid operated motor of this invention avoids such inherent characteristics of conventional fluid motors. In particular, the fluid operated motor of this invention can operate down to zero speed and, due to the phasing of the cylinders thereof, plus long moment arms, high break-away torque is always available to start the fluid motor of this invention so that a moderate working pressure can be utilized. This feature is especially important in such applications as marine-deck winches, factory hoists, machine tool spindle drives, and the like.

It has been found that the fluid operated motor of this invention, can replace the expensive and conventional motor means of such winches, hoists, spindle drives and the like at a fraction of the cost thereof and provide better performance than the replaced conventional motor means.

For example, in the case of a machine tool spindle drive, a conventional 25 horsepower unit that is normally utilized has mechanical means or direct current drives provided with necessary controls whereby the entire cost thereof is excessive. However, it has been found that if the fluid operated motor of this invention having this same horsepower rating is utilized, the same can be supplied at a fraction of the cost of the prior known mechanical or electrical drive. In addition, maintenance costs of the fluid operated motor of this invention are a fraction of the maintenance costs of conventional motor means intended for comparable service.

Further, because the existing machine tool spindle drives have definite speed ranges, quite often the optimum speed cannot be obtained for cutting a particular piece of stock. However, the fluid operated motor of this invention has a variable speed feature which will allow the machine tool operator to select and hold the optimum cutting speed for the occasion.

In regard to the conventional motor means for factory electric hoists, it has been found that the contact points thereof are constantly burning out which is always a troublesome and costly maintenance problem. This is caused by the operator "jogging" the push button switches to control the speed of the hoist. However, the fluid operated motor of this invention is readily adapted to replace the conventional electrical motor means of the hoist, because the variable speed features thereof will eliminate the jerking effects in hoisting by the aforementioned "jogging" of the electrical switches. Further, the load to be lifted can be handled easier and safer by the fluid operated motor embodiment of the invention.

The fluid operated motor of this invention comprises a housing having at least one bank of two cylinder defining members mounted in the housing and having a pair of pistons in the cylinders disposed 90° apart relative to the crankshaft to prevent stalling of the motor in a manner hereinafter described, a feature heretofore unattainable in the fluid motor art. The pistons are interconnected to the crankshaft in a novel manner whereby the opposed end surfaces of each of the pistons are utilized as working surfaces with equal working areas. In this manner, a two piston fluid operated motor embodiment of this invention has the equivalent torque ripple of a four cycle conventional engine.

Further, because of the long moment arms interconnecting the pistons of the crankshaft coupled with the phasing of the pistons thereof, a high break-away torque is always available for starting the fluid operated motor with a relatively low fluid pressure.

Fluid pressure is directed to the appropriate working surface of the pistons of the fluid operated motor of this invention by a suitable valving arrangement. However, it has been found that the use of the fluid pressure distributing valve of this invention is particularly advantageous in the operation of the fluid operated motor of this invention in a simple and effective manner, as hereinafter described. However, it is to be understood that the fluid distributing valve of this invention can be utilized for other purposes, as desired, such as for sequencing cylinders to handle tooling, cutting feeds and other operations in accurate relation to each other.

The fluid distributing valve of this invention incorporates the porting features of one or more previously known four-way valves of the slide type or of the rotary type. However, existing slide type four-way valves have linear movement from one position to the opposite position, while existing rotary type four-way valves have a valve member that oscillates through a portion of an arc or a circle to repeat the cycling feature thereof. The fluid distributing valve of this invention has a rotary valve member that continues to rotate in one direction and repeats the sequencing action of the valve every 360° of rotation of the valve member thereof. The operating function of the valve of this invention is timed with the device it operates, thereby minimizing operational difficulties.

Thus, it can be seen that the valve of this invention is more accurate than prior known valves because the valve members of the prior known valves must change direction to repeat the cycle thereof whereas the valve member of this invention merely continues to rotate in one direction to repeat the cycle thereof.

The conventional slide type four-way valves have undesirable inertia effects which are particularly of importance as the valve approaches the cut off point. The valve of this invention has a flow patch that is relatively unrestricted and inherently has a low pressure drop across the valve whereby the inertia effects of the valve of this invention are insignificant as compared with conventional slide-type rotary valves.

Conventional four-way valves are commonly made up of a body, sleeve and spool and all parts must be very accurately made whereby the cost of such valves is relatively high. However, the valve of this invention consists mainly of two parts, namely a stationary body and a rotary spool or valve member which can be easily fabricated with the usual shop machine tools and are interconnected together by two inexpensive bearings for accurate alignment. A valve of this invention can be produced for approximately half the cost of existing four-way valves of comparable rating.

Further, since reciprocating movement is provided by the spool of the conventional slide-type four-way valves, under wear is caused on the sealing O rings thereof because of the change in direction of movement of the slide member thereof. Thus special O rings must be provided in these conventional valves to compensate for the excessive wear caused thereby. However, the fluid distributing valve of this invention is adapted to readily utilize standard O ring sealing means because the rotary valve member thereof moves in a continuous manner in one direction so that little wear of the O rings is provided. Thus, the fluid sealing of the valve of this invention is accomplished as cheaply as possible without special backup rings often required in reciprocating slide type four-way valves.

In general, the fluid distributing valve of this invention comprises a housing having a bore passing therethrough and one or more banks of ports interconnected to the bore. A rotary valve member is rotatably mounted in the bore of the housing and has one or more recesses interrupting the external surface thereof to be respectively associated with the banks of ports to function in a novel manner hereinafter described.

Each bank of ports of the valve of this invention comprises a pair of opposed pressure and drain ports and a pair of opposed motor ports. The rotary valve member of this invention, when in one position thereof, is adapted to block the drain and pressure ports from the motor ports and, when in another position thereof, is adapted to interconnect one of the drain and pressure ports to both of the motor ports while blocking the other of the drain and pressure ports from the motor ports. In this manner, during 180° of rotation of the valve member of this invention, the valve member is adapted to interconnect the pressure port to at least one of the motor ports without having any pressure drop characteristics. Thereafter, the valve member can be rotated through another 180° in the same direction and interconnect at least one of the motor ports to the drain port without having noticeable pressure drop therebetween while blocking the pressure port from the motor ports.

Accordingly, it is an object of this invention to provide an improved fluid distributing valve having one or more of the novel features set forth above or hereinafter shown or described.

Another object of this invention is to provide an improved fluid operated motor having one or more of the novel features set forth above or hereinafter shown or described.

Another object of this invention is to provide a fluid distributing valve which can be inexpensively manufactured to distribute fluids to a predetermined passage with a predetermined time phase relationship.

A further object of this invention is to provide a fluid distributing valve which is adapted to distribute fluid with a minimum of pressure drop across the valve.

Another object of this invention is to provide a fluid operated motor which is adapted to operate at any desired speed without having noticeable "humping" of the shaft speed.

Another object of this invention is to provide a fluid operated motor which has high break away torque so as to be started with a moderate working pressure.

A further object of this invention is to provide an improved fluid operated motor which can be inexpensively manufactured and will operate in a simple manner.

A further object of this invention is to provide a fluid operated motor wherein each of the pistons thereof has a pair of opposed working surfaces of equal areas.

Another object of this invention is to provide an improved fluid operated motor having at least one bank of two pistons disposed at 90° relative to each other to eliminate any stalling characteristics of the motor.

Other objects and advantages of the invention will be apparent from the following description taken in connection with the accompanying drawings in which:

FIGURE 8 is a schematic view illustrating the hydraulic connections between the fluid distributing valve of this invention and the various pistons of the fluid operated motor of this invention.

FIGURES 9–13 are respectively schematic views illustrating the valving sequence for driving a piston from bottom dead center to top dead center while the rotary valve member of this invention rotates through 180°.

Figure 1:
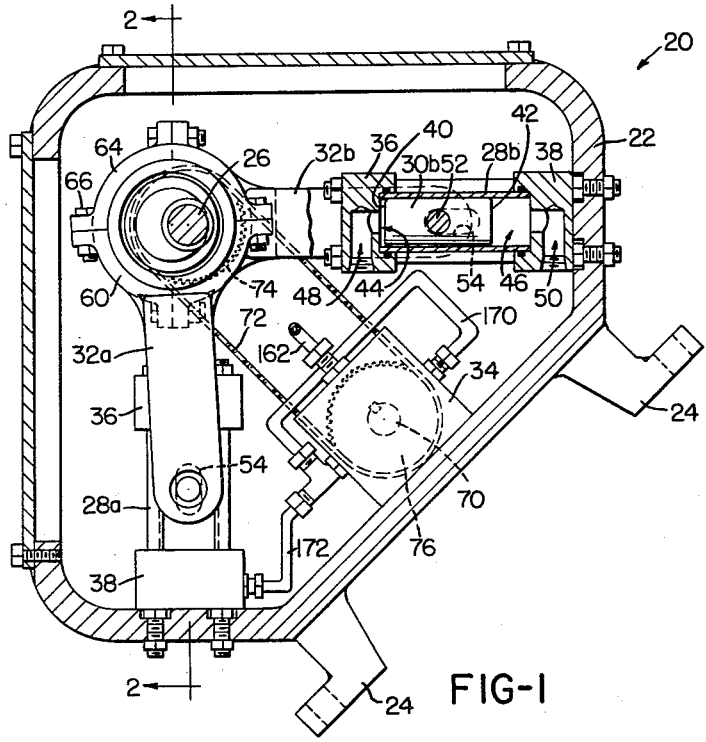
FIGURE 1 is a cross-sectional, partially broken away view illustrating the improved fluid operated motor of this invention with certain parts thereof eliminated.

While the various features of the fluid operated motor of this invention are hereinafter described and illustrated as being incorporated in a hydraulic motor or the like, it is to be understood that the various features of this invention can be utilized separately, as desired. Further, while the rotary valve of this invention is illustrated as being utilized in combination with the fluid operated motor of this invention, it is to be understood that the fluid distributing valve of this invention can be utilized for other purposes, as desired. Hence, the invention is not to be limited to only the applications and embodiments thereof illustrated in the drawings, as the drawings are merely utilized to illustrate one of the wide variety of possible uses of this invention.

Figure 2:
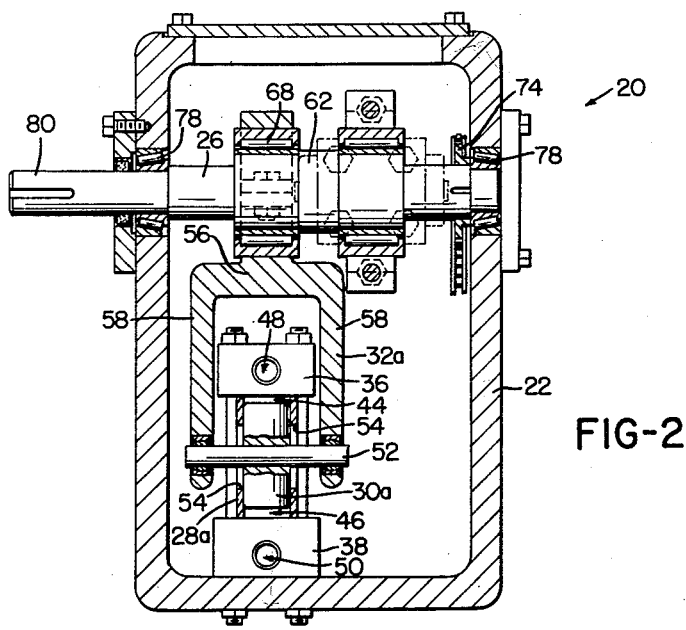
FIGURE 2 is a cross-sectional view of the fluid operated motor illustrated in FIGURE 1 and is taken on line 2—2 thereof.

Referring now to FIGURES 1 and 2, the improved fluid operated motor of this invention is generally indicated by the reference numeral 20 and comprises a housing 22 having suitable mounting feet 24, a crankshaft 26 rotatably mounted in the housing 22, a pair of cylinder defining members 28a and 28b mounted in the housing 22 and disposed at right angles relative to the crankshaft 26 for a purpose hereinafter described, a pair of pistons 30a and 30b respectively disposed in the cylinders of the cylinder-defining members 28a and 28b, and a pair of connecting arms or rods 32a and 32b respectively interconnecting the pistons 30a and 30b to the crankshaft 26 in a manner hereinafter described to translate the reciprocating motion of the pistons 30a and 30b into rotary motion of the crankshaft 26.

A fluid distributing valve 34 of this invention is mounted in the housing 22 between the cylinder defining members 28a and 28b and is adapted to sequentially direct fluid against the working surfaces of the pistons 30a and 30b in a manner hereinafter described to cause the pistons 30a and 30b to reciprocate in the cylinder defining members 28a and 28b to rotate the crankshaft 26.

Thus, it can be seen that the fluid operated motor 20 is formed from a relatively few basic parts disposed in a compact manner within the housing 22 to effectively rotate the crankshaft 26 in a manner that will be apparent hereinafter.

The more specific details of the fluid operated motor 20 will now be described.

Each cylinder defining member 28a and 28b has the opposed ends thereof closed by suitable headers 36 and 38 which respectively cooperate with the opposed working surfaces 40 and 42 of the respective piston 30a or 30b to define a pair of compartments 44 and 46 within the respective cylinder-defining member 28a or 28b. Passage means 48 and 50 are respectively formed in the headers 36 and 38 to interconnect the exterior thereof with the compartments 44 and 46 so that suitable conduit means can interconnect various motor ports of the rotary valve 34 to the compartments 44 and 46 to distribute fluid thereto in a manner hereinafter described to cause pistons 30a and 30b to reciprocate and thereby rotate the crankshaft 26.

Pins 52 respectively pass transversely through the medial portions of the pistons 30a and 30b and have opposed ends passing through elongated slots 54 formed in the side walls of the cylinder defining members 28a and 28b so that the pistons 30a and 30b can be reciprocated relative thereto.

The pins 52 are interconnected to the connecting arms 32a and 32b so that reciprocal movement of the pistons 30a and 30b is transmitted to the crankshaft 26 to rotate the same in a manner hereinafter described.

In this manner, the medial portion of the pistons 30a and 30b are interconnected to the connecting arms 32a and 32b so that one of the opposed working surfaces 40 and 42 of each piston 30a and 30b need not be utilized for this interconnecting feature as in prior known devices. Thus, the opposed surfaces 40 and 42 of each piston 30a and 30b is equal in area and can be utilized as working surfaces whereby each piston 30a or 30b gives equivalent torque ripple of a two-cycle engine, a feature heretofore unattainable in the fluid motor art.

Each connecting arm 32a and 32b comprises a yoke-like member 56, FIGURE 2, having a pair of spaced legs 58 straddling the respective cylinder defining member 28a or 28b and respectively being interconnected to the free ends of the respective piston pin 52.

The outer end 60 of the connecting rod 32a or 32b comprises a semi-circular structure adapted to encompass half of an eccentric 62 of the crankshaft 26 and can be secured thereto by another semi-circular retainer 64 interconnected to the outer end 60 of the respective connecting arms 32a or 32b by a plurality of bolts 66. A suitable needle bearing 68 or the like is disposed between the respective connecting arm 32a or 32b and the eccentric 62 of the crankshaft 26 as best illustrated in FIGURE 2.

Thus, it can be seen that the two pistons 30a and 30b are interconnected to a common eccentric 62 of the crankshaft 26 whereby the crankshaft can be inexpensively manufactured with a minimum of machining operations.

As illustrated in FIGURES 1 and 2, the piston 30b is at top dead center while the piston 30a is in the center of its travel toward top dead center. Therefore, assuming that the crankshaft 26 is to be rotated in a clockwise direction as illustrated in FIGURE 1, fluid pressure is being delivered to the compartment 46 of the cylinder-defining member 28a to cause the piston 30a to move upwardly as illustrated in FIGURES 1 and 2 while fluid pressure is about to be directed to the compartment 44 of the cylinder defining member 28b to cause the piston 30b thereof to move to the right as illustrated in FIGURE 1. Simultaneously the compartment 44 of the cylinder defining member 28a is being interconnected to drain to permit upward movement of the piston 30a. Likewise, the compartment 46 of the cylinder defining member 28b is about to be interconnected to drain to permit movement of the piston 30b to the right as illustrated in FIGURE 1.

When the piston 30a reaches top dead center, the piston 30b is in the center of its travel toward the header 38 whereby it can be seen that the fluid operated motor 20 cannot be stalled because one of the pistons 30a or 30b is always at its center of travel while the other piston is at top or bottom dead center.

Further, the connecting rods 32a and 32b provide relatively long movement arms whereby a relatively low fluid pressure can be utilized to start the motor regardless of the position of the pistons 30a and 30b thereof.

Thus, the fluid operated motor 20 can be operated at low speeds, when desired, without having humping thereof or stalling characteristics.

When the piston 30a reaches top dead center, the fluid pressure delivered to the compartment 46 thereof is terminated and the compartment 46 is interconnected to drain while the compartment 44 thereof is interconnected to the fluid pressure to permit the piston 30a to move back toward bottom dead center. Similarly, when the piston 30b reaches bottom dead center, the fluid pressure being delivered to the compartment 44 is terminated and the compartment 44 is interconnected to drain while the compartment 46 thereof is interconnected to the fluid pressure to cause the piston 30b to move back to top dead center toward the header 36.

The fluid pressure being so directed to the compartments 44 and 46 to the cylinder defining members 28a and 28b to effect movement of the pistons 30a and 30b thereof in the proper sequence, is controlled by the fluid distributing valve 34 of this invention in properly timed relation whereby the fluid operated motor 20 is operated in a smooth and effective manner.

This is accomplished by a rotary member 70 (FIGURE 1), of the valve 34 which is rotated in sequence with the crankshaft 26 by a suitable chain 72 passing over a sprocket 74 carried on the crankshaft 26 and a sprocket 76 carried on the rotary valve member 70. Thus, for each 360° of rotation of the crankshaft 26, the rotary valve member 70 is also rotated through 360° so that the fluid distributing valve 34 interconnects the fluid pressure to the appropriate compartments of the cylinder defining members 28a and 28b and interconnects the drain to the appropriate compartments thereof in a proper timed relation to permit the fluid operated motor 20 to operate in the above manner. Alternatively, proper timing can be achieved through the use of suitable gearing interconnecting crankshaft 26 and rotary member 70 with the rotational axes of these members disposed in either parallel or angular relationship, if desired.

The crankshaft 26 of the fluid operated motor 20 is rotatably mounted to the housing 22 by suitable bearings 78 and has an end 80 projecting from the housing 22 to be interconnected to the desired device to be driven by the fluid operated motor 20 in a manner well known in the art.

The fluid distributing valve 34 of this invention will now be described and reference is made to FIGURES 3–7 of the drawings.

The fluid distributing valve 34 comprises a housing 82 having a bore 84 passing longitudinally therethrough. A pair of end plates 86 and 88 are respectively secured to the opposed ends of the housing 82 by bolts 90 to close off the ends of the bore 84 in the housing 82. A plurality of port banks 92, 94, 96 and 98 are formed in the housing 82 in the following manner.

A common fluid pressure receiving passageway 100 is formed in the housing 82 parallel to the bore 84 thereof. Similarly, a drain interconnecting passageway 102 is formed in the housing 82 and is disposed opposed to the fluid pressure receiving passageway 100. Subsequently, the left hand ends of the passageways 100 and 102 are closed by suitable threaded plugs or the like.

The fluid pressure receiving passageway 100 is interconnected to the bore 84 of the housing 82 by pressure ports 104, 106, 108 and 110 disposed in spaced aligned relation and formed in the housing 82. Similarly, the drain interconnecting passageway 102 is interconnected to the bore 84 by drain ports 112, 114, 116 and 118 disposed in spaced aligned relation and being respectively opposed to the pressure ports 104, 106, 108 and 110 as illustrated in FIGURES 3–7.

The pressure ports 104, 106, 108 and 110 and drain ports 112, 114, 116 and 118 can be simultaneously formed in the housing 82 by drilling four aligned bores in the housing 82, the drilled bores passing through the passageways 100 and 102.

Figure 4:
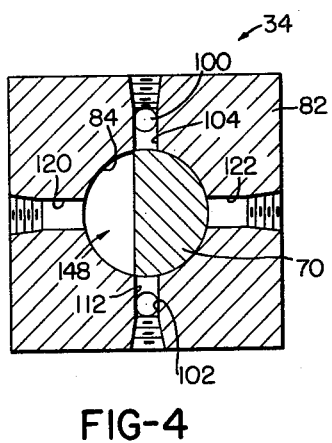
FIGURE 4 is an axial cross-sectional view of the valve illustrated in FIGURE 3 and is taken on line 4—4 thereof.

As illustrated in FIGURE 4, a pair of opposed motor ports 120 and 122 are formed in the housing 82 and interconnect the exterior thereof with the bore 84, the motor ports 120 and 122 being disposed in the same plane as the pressure and drain ports 104 and 112 whereby the ports 104, 112, 120 and 122 form the bank 92 of ports previously mentioned.

Figure 5:
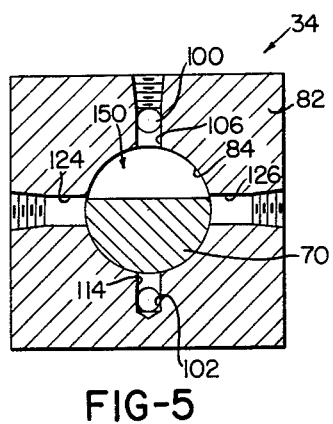
FIGURE 5 is an axial cross-sectional view of the valve illustrated in FIGURE 3 and is taken on line 5—5 thereof.

Similarly, a pair of opposed motor ports 124 and 126 are formed in the housing 82, as illustrated in FIGURE 5, to interconnect the exterior thereof with the bore 84 and are disposed in the same plane as the pressure and drain ports 106 and 114. In this manner the ports 106, 114, 124 and 126 form the port bank 94 of the valve 34.

Figure 6:
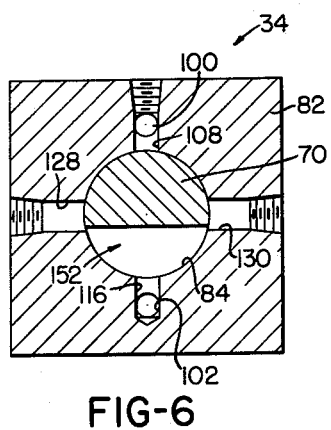
FIGURE 6 is an axial cross-sectional view of the valve illustrated in FIGURE 3 and is taken on line 6—6 thereof.

As illustrated in FIGURE 6, a pair of motor ports 128 and 130 interconnect the exterior of the housing 82 to the bore 84 and are disposed in the same plane as the pressure and rain ports 108 and 116. Thus, the ports 108, 116, 128 and 130 form the port bank 96 of the valve 34.

Figure 7:
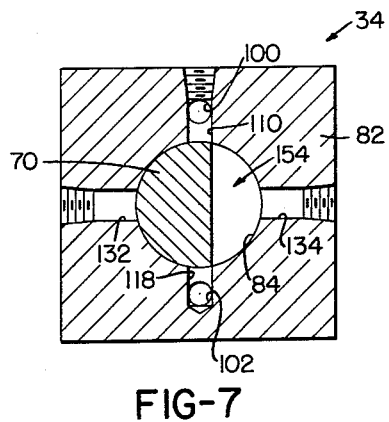
FIGURE 7 is a view similar to FIGURE 6 and is taken on line 7—7 of FIGURE 3.

As illustrated in FIGURE 7, a pair of opposed motor ports 132 and 134 are formed in the housing 82 to interconnect the exterior thereof with the bore 84 and are disposed in the same plane as the pressure and drain ports 110 and 118, the ports 110, 118, 132 and 134 forming the port bank 98 of the valve 34.

In this manner, it can be seen that the motor ports 120, 124, 128 and 132 are formed in spaced aligned relation in the housing 82 and are respectively disposed opposite to the motor ports 122, 126, 130 and 134 formed in spaced aligned relation in the housing 82.

The motor ports 120, 122, 124, 126, 128, 130, 132 and 134 can be formed in the housing 82 by simply drilling four bores through the housing 82, the motor bores respectively intersecting the pressure and drain bores and being disposed perpendicularly thereto.

Thus, as illustrated in FIGURES 4–7, each bank 92, 94, 96 and 98 of ports formed in the housing 82 comprises a pair of opposed pressure and drain ports and a pair of opposed motor ports disposed at right angles relative to the pressure and drain ports.

The motor ports are slightly larger in diameter than the drain and pressure ports, for a purpose hereinafter described.

The rotatable valve member 70 of the valve 34 has an enlarged body portion 136 snugly received in the bore 84 of the housing 82 and is rotatably mounted therein by a pair of opposed shafts 138 and 140 respectively received in the bearings 142 and 144 disposed in the bore 84 of the housing 82, the shaft 140 projecting beyond the end plate 88 of the housing 82 to be interconnected to the crankshaft 26 of the fluid-operated motor 20 by the chain drive 72 previously described to rotate the valve member 70 in unison with the crankshaft 26.

Figure 3:
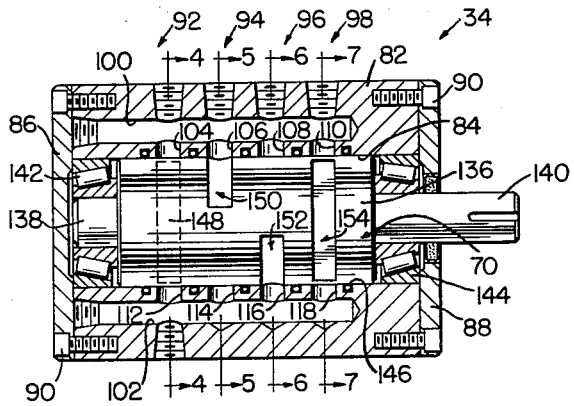
FIGURE 3 is an axial cross-sectional view of the improved fluid-distributing valve of this invention.

Each bank 92, 94, 96 and 98 of ports formed in the housing 82 is sealed from the adjacent bank of ports by suitable O-rings 146 disposed therebetween, as illustrated in FIGURE 3, and respectively engaging the housing 82 and the rotatable valve member 70 in sealing relation therewith.

The upper end of the pressure port 104 is adapted to be interconnected to a source of fluid pressure in a manner hereinafter described, so that the fluid pressure receiving passageway 100 will be connected thereto, the upper portion of the pressure ports 106, 108 and 110 being closed by suitable threaded plugs, or the like.

The lower end of the drain port 112 is suitably interconnected to a drain in a manner hereinafter described, so that the common passageway 102 interconnects the drain ports 112, 114, 116 and 118 to the drain.

The enlarged portion 136 of the rotatable valve member 70 has the exterior surface thereof interrupted by a plurality of recesses or kerfs 148, 150, 152 and 154, as illustrated in FIGURES 3–7, whereby each recess 148, 150, 152 and 154 is respectively associated with the banks 92, 94, 96 and 98 of ports in the manner illustrated in FIGURES 4–7.

The recesses 148 and 154 are disposed on opposite sides of the valve member 70, while the recesses 150 and 152 are disposed at right angles thereto and are disposed on opposite sides of the valve member 70 for a purpose hereinafter described.

When the valve member 70 is in the position illustrated in FIGURE 3, the valve member 70 completely blocks the pressure and drain ports 104 and 112 from the motor ports 120 and 122, as best illustrated in FIGURE 4, the rotatable valve member 70 interconnects the pressure port 106 with the motor ports 124 and 126 by the recess 150 thereof while blocking the drain port 114 from the motor ports 124 and 126 as best illustrated in FIGURE 5, the valve member 70 blocks the pressure port 108 from the motor ports 128 and 130 while interconnecting the drain port 116 with the motor ports 128 and 130 by the recess 152 thereof as best illustrated in FIGURE 6, and the rotatable valve member 70 blocks the pressure and drain ports 110 and 118 from the motor ports 132 and 134 as best illustrated in FIGURE 7.

However, as the valve member 70 is rotated from the position illustrated in FIGURES 3–7, the same sequentially either interconnects the pressure ports with the motor ports or the drain ports with the motor ports in a predetemined sequence as will be apparent hereinafter.

Fluid communication is established between fluid distributing valve 34 and the cylinder defining means 28a and 28b, as illustrated in FIGURE 8. A pump 156 draws hydraulic fluid from a storage tank 158 through an inlet conduit means 160 and supplies the same under pressure out through an outlet conduit means 162 leading to the upper end of the pressure port 104 of the valve 34. A suitable throttle valve 164 is disposed in the conduit means 162 to regulate the amount of fluid being delivered by the pump 156 of the rotary valve 34.

Alternately, the pump 156 can be a variable delivery pump whereby the amount of fluid distributed by the valve 34 is regulated by simply regulating the speed of the pump or otherwise, whereby the speed of rotation of the crankshaft 26 of the fluid operated motor 20 is regulated to any desired speed.

The lower end of the drain port 112 of the valve 34 is interconnected back to the storage tank 158 by an outlet conduit means 166.

In this manner, the valve 34 directs fluid pressure from the pump 156 to the cylinder defining means 28a and 28b and returns the fluid back to the storage tank 158 through the conduit means 166.

A pair of conduit means 168 and 170 are respectively connected to the motor ports 120 and 122 of the port bank 92 of the valve 34 and are respectively interconnected to a conduit means 172 leading to the compartment 46 of the cylinder defining means 28a.

The motor ports 132 and 134 of the port bank 98 of the valve 34 are respectively interconnected to a conduit means 174 by a pair of conduit means 176 and 178, the conduit means 174 leading to the compartment 44 of the cylinder defining means 28a.

A pair of conduit means 180 and 182 respectively interconnect the motor ports 124 and 126 of the port bank 94 of the valve 34 to a conduit means 184 leading to the compartment 46 of the cylinder defining means 28b.

Similarly, a pair of conduit means 186 and 188 interconnect the motor ports 128 and 130 of the port bank 96 of the valve 34 to a conduit means 190 leading to the compartment 44 of the cylinder defining means 28b.

The operation of the rotary fluid distributing valve 34 will now be described.

While only the sequence of moving the piston 30a in the cylinder defining means 28a from bottom dead center to top dead center is illustrated, it is to be understood that the piston 30b of the cylinder defining means 28b is moved in a like manner, except that the piston 30b is 90° out of phase with the piston 30a to provide for the anti-stalling feature previously described.

As illustrated in FIGURE 9, the piston 30a is at bottom dead center when the rotary member 70 of the valve 34 is in the position illustrated in FIGURES 3–7 whereby the rotary valve 70 blocks off the pressure and drain ports 104 and 112 from the motor ports 120 and 122 of the port bank 92 thereof and blocks the pressure and drain ports 110 and 118 from the motor ports 132 and 134 of the port bank 98 thereof so that no fluid pressure is being delivered against the piston 30a in the cylinder defining means 28a when the same is exactly at bottom dead center.

However, as the rotary valve member 70 rotates clockwise as illustrated in FIGURE 10, under the influence of the crankshaft 26 being rotated in a like direction by the traveling piston 30b, the pressure port 104 is interconnected to the motor port 120 of the port bank 92 thereof by the recess 148 so that fluid pressure from the pump 156 is delivered to the conduit means 172 leading to the compartment 46 of the cylinder defining member 28a to cause initial movement of the piston 30a to the right as illustrated in FIGURE 10 toward top dead center. When fluid pressure is directed to the compartment 46 of the cylinder defining member 28a, any fluid present in the chamber 44 thereof is forced out of the chamber 44 by the moving piston 30a through the conduit means 174 into the motor port 134 and out through the drain port 118 to the drain conduit means 166 by the recess 154 of the valve member 70.

As the valve member 70 continues to rotate from the position illustrated in FIGURE 10 to the position illustrated in FIGURE 11, the piston 30a has traveled half of its distance toward top dead center and the pressure port 104 of the port bank 92 is now interconnected to both of the motor ports 120 and 122 by the recess 148 thereof whereby no pressure drop is realized across the valve 34 when the valve member 70 is in the position illustrated in FIGURE 11. Similarly, the recess 154 of the rotary valve 70 interconnects the motor ports 132 and 134 of the port bank 98 with the drain port 118 to prevent any restriction in the flow of the fluid being expelled from the compartment 44 of the cylinder defining member 28a when the valve member 70 is disposed in the position illustrated in FIGURE 11.

As the valve member 70 rotates from the position illustrated in FIGURE 11 to the position illustrated in FIGURE 12, the pressure port 104 of the port bank 92 is now interconnected to the motor port 122 by the recess 148 of the valve member 70 while the motor port 132 of the port bank 98 is interconnected to the drain port 118 by the recess 154 of the valve member 70.

When the piston 30a reaches top dead center, the rotary valve member 70 has reached the position illustrated in FIGURE 13 whereby the valve member 70 again blocks off the pressure and drain ports 104 and 112 of the port bank 92 from the motor ports 120 and 122 of the bank 92 thereof and simultaneously blocks off the pressure and drain ports 110 and 118 of the port bank 98 from the motor ports 132 and 134 so that no fluid is being delivered to or expelled from the cylinder defining member 28a.

Further clockwise rotation of the valve member 70 from the position illustrated in FIGURE 13 now causes the piston 30a to move back toward bottom dead center in substantially the same manner that the piston 30a is moved toward top dead center as illustrated in FIGURES 9–13. However, fluid pressure is delivered to the compartment 44 of the cylinder-defining member 28a by the port bank 98 while the compartment 46 is interconnected to drain by the port bank 92.

Thus, it can be seen that the rotary valve member 70 of the fluid-distributing valve 34 is so constructed and arranged that the same is adapted to direct fluid to the compartment 46 of the cylinder defining member 28a while simultaneously interconnecting the compartment 44 thereof with drain to cause the piston 30a to move from bottom dead center to top dead center and, thereafter, interconnect the compartment 44 to the pressure fluid and the compartment 44 thereof to drain to cause the piston 30a to move from top dead center to bottom dead center.

Thus, for each 360° of rotation of the valve member 70, the piston moves from bottom dead center to top dead center and then back to bottom dead center.

In this manner, the piston 30a reciprocates back and forth in the cylinder-defining means 28a under the influence of the fluid pressure being distributed by the valve 34 so that the crankshaft 26 of the hydraulic motor 20 is rotated in a clockwise direction.

Similarly, the port banks 94 and 96 of the rotary valve 34 operate in substantially the same manner as illustrated in FIGURES 9–13 to cause the piston 30b to reciprocate in the cylinder defining member 28b except that the piston 30b is reciprocated 90° out of phase relative to the piston 30a as illustrated in FIGURE 8.

The recesses formed in rotary valve member 70 of the valve 34 and the various motor ports formed in the housing 82 are so constructed and arranged that when the rotary valve member 70 is rotated 90° or 270° from the position illustrated in FIGURE 9, no pressure drop is realized across the valve member 34, a feature heretofore unattainable in the valving art.

Thus, it will be seen that a fluid operated motor embodying the invention is less expensive than conventional motor means and yet has improved operation characteristics.

While particular embodiments of the invention have been illustrated and described, all of which are presently considered preferred embodiments, it will be obvious to those skilled in the art that various changes or modifications may be made without departing from the invention, and it is intended in the appended claims to include all such changes or modifications that fall within the true spirit and scope of the invention.

Having thus described my invention, what I claim as new and useful and desire to secure by United States Letters Patent is:

1. A valve comprising a housing having a bore, said housing having opposed pressure and drain ports interconnected with said bore at spaced intervals along the axis thereof and having a pair of opposed motor ports interconnected with said bore, a rotatable valve member disposed in said bore and having a recess interrupting the exterior surface thereof and extending transversely relative to said bore, said valve member when in one position thereof blocking said pressure and drain ports from said motor ports and when rotated from said one position to another position thereof interconnecting one of said drain and pressure ports to both of said motor ports by said recess thereof and blocking the other of said drain and pressure ports from said motor ports.

2. A valve as set forth in claim 1 wherein said other position of said valve member is disposed 90° from said one position thereof.

3. A valve as set forth in claim 1 wherein said ports of said housing are disposed in a common plane.

4. A valve comprising a housing having a bore and a plurality of banks of ports interconnected with said bore, each bank of ports including a pair of opposed pressure and drain ports and a pair of opposed motor ports, a rotatable valve member disposed in said bore and having a plurality of recesses spaced apart along the axis of said member and extending transversely relative to said bore interrupting the exterior surface thereof, each recess being associated with one of said banks of said ports, said valve member when in one position thereof blocking said pressure and drain ports of one of said banks from said motor ports of said one bank and when rotated from said one position to another position thereof interconnecting one of said drain and pressure ports of said one bank to both of said motor ports of said one bank by said associated recess thereof and blocking the other of said drain and pressure ports of said one bank from said motor ports of said one bank.

5. A valve as set forth in claim 4 wherein the recess of said valve member associated with another bank of said ports interconnects one of said drain and pressure ports of said other bank with said motor ports of said other bank when said valve member is in said one position thereof.

6. A valve as set forth in claim 4 wherein said valve member blocks said drain and pressure ports of another bank of said ports from said motor ports of said other bank when said valve member is in said one position thereof and interconnects the drain port of said other bank to said motor ports of said other bank when said valve member interconnects the pressure port of said one bank with the motor ports of said one bank.

7. In combination, a pair of cylinders having their respective axes disposed at right angles, a pair of pistons respectively disposed in said cylinders and having opposed surfaces, said opposed surfaces cooperating with said cylinder to define two compartments therewith, a crankshaft, means operatively connecting said pistons to said crankshaft and displaced 90 degrees in time phase relation, a valve having a housing provided with a bore and provided with first and second banks of ports interconnected with said bore, each bank of ports including a pair of opposed drain and pressure ports and a pair of opposed motor ports, means interconnecting said motor ports of said first bank with one of said compartments of said cylinders, means interconnecting said motor ports of said second bank with the other of said compartments, a rotatable valve disposed in said bore and having the exterior surface thereof interrupted by a pair of recesses respectively associated with said first and second banks of ports, said valve member when in one position thereof blocking said drain and pressure ports of the respective banks of ports from the motor ports thereof and when in another position thereof interconnecting the pressure port of said first bank with the motor ports thereof and interconnecting the drain port of said second bank with the motor ports thereof whereby said one compartment is interconnected to pressure and said other compartment is connected to drain.

8. In combination, a cylinder, a piston disposed in said cylinder and having opposed surfaces of equal areas, said opposed surfaces cooperating with said cylinder to define two compartments therewith, a valve having a housing provided with a bore and provided with first and second banks of ports interconnected with said bore, each bank of ports including a pair of opposed drain and pressure ports and a pair of opposed motor ports, means interconnecting said motor ports of said first bank with one of said compartments of said cylinder, means interconnecting said motor ports of said second bank with the other of said compartments, a rotatable valve disposed in said bore and having the exterior surface thereof interrupted by a pair of recesses respectively associated with said first and second banks of ports, said valve member when in one position thereof blocking said drain and pressure ports of the respective banks of ports from the motor ports thereof and when in another position thereof interconnecting the pressure port of said first bank with the motor ports thereof and interconnecting the drain port of said second bank with the motor ports thereof whereby said one compartment is interconnected to pressure and said other compartment is connected to drain.

References Cited by the Examiner
UNITED STATES PATENTS

| | | | |
|---|---|---|---|
| 470,978 | 3/92 | Bruce | 121—121 |
| 639,686 | 12/99 | Parks | 123—51 |
| 963,043 | 7/10 | Gremel | 123—55 |
| 1,083,686 | 1/14 | Kuhn | 91—180 |
| 1,344,490 | 6/20 | Downie | 137—625.23 |
| 2,014,997 | 9/45 | Auger | 123—55 |
| 2,203,648 | 6/40 | Dons | 123—51 |
| 2,397,130 | 3/46 | Dawson | 121—121 |
| 2,505,951 | 5/50 | Feaster | 121—121 |
| 2,564,363 | 8/51 | Horowitz et al. | 121—117 |
| 2,674,853 | 4/54 | Born | 121—121 |
| 2,853,102 | 9/58 | Walker | 137—624 |
| 2,921,604 | 1/60 | Zettl | 137—625.43 |

FRED E. ENGELTHALER, *Primary Examiner.*

KARL J. ALBRECHT, RICHARD B. WILKINSON, CHARLES F. GAREAU, *Examiners.*